(12) United States Patent
Yoshii et al.

(10) Patent No.: US 8,326,138 B2
(45) Date of Patent: Dec. 4, 2012

(54) IMAGING APPARATUS

(75) Inventors: Masayuki Yoshii, Osaka (JP); Takuya Hara, Osaka (JP); Nobuhisa Koike, Nara (JP)

(73) Assignee: Sony Corporation, Tokyo (JP)

( * ) Notice: Subject to any disclaimer, the term of this patent is extended or adjusted under 35 U.S.C. 154(b) by 4 days.

(21) Appl. No.: 13/067,475

(22) Filed: Jun. 3, 2011

(65) Prior Publication Data

US 2012/0045194 A1 Feb. 23, 2012

(30) Foreign Application Priority Data

Aug. 23, 2010 (JP) .................................. 2010-186572

(51) Int. Cl.
 *G03B 3/00* (2006.01)
 *G02B 7/28* (2006.01)
(52) U.S. Cl. ......................................... 396/89; 396/177
(58) Field of Classification Search .................... 396/89, 396/177
 See application file for complete search history.

(56) References Cited

U.S. PATENT DOCUMENTS

| 2005/0219402 A1 | 10/2005 | Noto |
| 2005/0265706 A1 | 12/2005 | Haraguchi |
| 2005/0276594 A1* | 12/2005 | Hamano ........................ 396/177 |
| 2006/0222357 A1 | 10/2006 | Tomimoto |
| 2008/0310832 A1* | 12/2008 | Deng ............................ 396/177 |

FOREIGN PATENT DOCUMENTS

| JP | 08-220615 A | 8/1996 |
| JP | 2004-252264 A | 9/2004 |
| JP | 2004-312432 | 11/2004 |

OTHER PUBLICATIONS

Extended European Search Report issued Nov. 25, 2011 for corresponding European Application No. 11 16 9694.

* cited by examiner

*Primary Examiner* — Clayton E LaBalle
*Assistant Examiner* — Dennis Hancock
(74) *Attorney, Agent, or Firm* — Rader Fishman & Grauer, PLLC (57) ABSTRACT

An imaging apparatus includes an apparatus body having an outer casing, at least a shutter mechanism and an imaging device placed inside the outer casing, an opening formed in the outer casing, and a storage space and a placement space defined inside the outer casing and communicating with the opening and the storage space, respectively, a strobe unit having a lid part and a light-emitting part and connected to the apparatus body so as to be movable between close and open positions, a sensor unit placed in the placement space and having an autofocus sensor and a sensor adjusting part having plural adjusting screws, and a mirror placed inside the outer casing to reflect part of incident light toward the autofocus sensor. When the strobe unit is moved to the open position, the storage space is defined as an adjustment space into which an adjustment jig can be inserted.

6 Claims, 11 Drawing Sheets

IMAGING APPARATUS

BACKGROUND

The present disclosure relates to an imaging apparatus. More specifically, the present disclosure relates to achieving miniaturization and a reduction in the number of components by reflecting light by a mirror toward an autofocus sensor placed near a strobe unit, and facilitating adjustment of the autofocus sensor.

Among various kinds of imaging apparatus such as a video camera and a still camera, some have a so-called autofocus function whereby focusing is executed automatically. The autofocus function is executed when light is made incident on an autofocus sensor placed inside an outer casing via a mirror.

Such an autofocus sensor forms a sensor unit together with a sensor adjusting part having a plurality of adjusting screws. Tilt adjustment for adjusting the orientation of the optical axis to a desired orientation is performed with the sensor adjusting part. Since it is necessary to perform tilt adjustment of the autofocus sensor in the final assembly step of the imaging apparatus, the sensor unit is placed on the outer edge side inside the outer casing, for example, at the lower end (see, for example, Japanese Unexamined Patent Application Publication No. 2004-312432), and a plurality of jig insertion holes are formed in the undersurface of the outer casing. An adjustment jig for performing tilt adjustment is inserted into each of the jig insertion holes.

Tilt adjustment of the autofocus sensor is performed by inserting the adjustment jig from each of the jig insertion holes, and rotating each of a plurality of adjusting screws of the sensor adjusting part as appropriate. After the tilt adjustment of the autofocus sensor is finished, to close the jig insertion holes, for example, a label printed with a production number or the like is affixed to the undersurface of the outer casing.

The imaging apparatus described in Japanese Unexamined Patent Application Publication No. 2004-312432 is configured such that a half mirror (semi-transparent mirror) and a sub-mirror are placed above the sensor unit inside the outer casing, light transmitted through the half mirror is reflected downward by the sub-mirror, and the reflected light is made incident on the autofocus sensor that is placed at the lower end inside the outer casing.

SUMMARY

However, the imaging apparatus described in Japanese Unexamined Patent Application Publication No. 2004-312432 has such a problem that since the sub-mirror is placed in addition to the half-mirror, a space for placing the sub-mirror is necessary inside the outer casing, which makes miniaturization that much harder.

Also, since the sub-mirror is necessary in addition to the half mirror, the number of components increases, and the internal structure becomes complex.

Further, since the sub-mirror has the function of reflecting light transmitted through the half-mirror to make the light incident on the autofocus sensor, it is necessary to adjust the tilt of the sub-mirror, which leads to the corresponding increase in the number of steps and assembly time when assembling the imaging apparatus.

On the other hand, to allow the autofocus sensor to exhibit good autofocus function, it is necessary to adjust the tilt of the autofocus sensor. Thus, it is also necessary to ensure such a configuration that allows this tilt adjustment to be performed easily.

Accordingly, it is desirable to achieve miniaturization and a reduction in the number of components, and also facilitate adjustment of the autofocus sensor.

According to an embodiment of the present disclosure, there is provided an imaging apparatus including an apparatus body having an outer casing, at least a shutter mechanism and an imaging device that are placed inside the outer casing, an opening formed in the outer casing, a storage space communicating with the opening, and a placement space communicating with the storage space, the storage space and the placement space being defined inside the outer casing, a strobe unit having a lid part and a light-emitting part, the strobe unit being connected to the apparatus body so as to be movable between a close position in which the opening is closed by the lid part and the light-emitting part is stored in the storage space, and an open position in which the opening is opened and the light-emitting part is exposed to an outside of the apparatus body from the opening, a sensor unit placed in the placement space, the sensor unit having an autofocus sensor and a sensor adjusting part provided with a plurality of adjusting screws that are rotatable for adjusting a tilt of the autofocus sensor, and a mirror that is placed inside the outer casing and reflects a part of incident light toward the autofocus sensor, in which when the strobe unit is moved to the open position, the storage space is defined as an adjustment space into which an adjustment jig for rotating the adjusting screws can be inserted.

Therefore, a sub-mirror for reflecting light toward the autofocus sensor is unnecessary, thereby achieving miniaturization and a reduction in the number of components. Also, in the imaging apparatus, in the state in which the sensor unit has been moved to the open position, the autofocus sensor can be adjusted by the sensor adjusting part via the opening in the outer casing, thereby facilitating adjustment of the autofocus sensor.

It is desirable that in the imaging apparatus mentioned above, the adjustment jig can be inserted into the adjustment space in a direction along an inner surface of the lid part.

Since the adjustment jig can be inserted into the adjustment space in the direction along the inner surface of the lid part, the lid part serves as a guide part for the adjustment jig when the adjustment jig is inserted into the adjustment space.

It is desirable that the imaging apparatus mentioned above further include a cover part that covers at least a part of the sensor unit from the opening side, the cover part being formed integrally with the outer casing.

Since the cover part that covers at least a part of the sensor unit from the opening side is formed integrally with the outer casing, the cover part is positioned between the opening and the sensor unit.

It is desirable that the imaging apparatus mentioned above further include a protective cover that is attached to the cover part after adjustment of the autofocus sensor to close the sensor unit from the opening side.

Since the protective cover that closes the sensor unit from the opening side is provided after adjustment of the autofocus sensor, the sensor unit is protected by the protective cover after adjustment of the autofocus sensor.

It is desirable that the imaging apparatus mentioned above further include a connecting arm that connects the strobe unit to the apparatus body, and that the adjusting screws of the sensor adjusting part be each positioned on an opposite side across the connecting arm.

Since the adjusting screws of the sensor adjusting part are each positioned on the opposite side across the connecting arm, when the adjustment jig is inserted into the adjustment space, the adjustment jig does not easily come into contact with the portion of the sensor adjusting part where the adjusting screws are not positioned.

It is desirable that the imaging apparatus mentioned above further include a cover part that covers at least a part of the sensor unit from the opening side, the cover part being formed integrally with the outer casing, and a connecting arm that connects the strobe unit to the apparatus body, and that the connecting arm overlap the cover part when the strobe unit is moved to the close position.

Since the connecting arm overlaps the cover part when the strobe unit is moved to the close position, the connecting arm is received by the cover part.

DETAILED DESCRIPTION OF EMBODIMENTS

Hereinbelow, the best mode for implementing an imaging apparatus according to an embodiment of the present disclosure will be described with reference to the attached drawings.

The best mode illustrated below represents the imaging apparatus according to an embodiment of the present disclosure as applied to a digital still camera.

It should be noted, however, that the scope of application of the present disclosure is not limited to a digital still camera, but the present disclosure can be widely applied to various other kinds of apparatus having an autofocus sensor and a strobe unit.

In the following description, it is assumed that directions such as front, rear, up, down, left, and right indicate directions as viewed from a photographer when shooting with the imaging apparatus (digital still camera). Therefore, the subject side is in the front, and the photographer side is in the rear.

It should be noted that the directions such as front, rear, up, down, left, and right illustrated in the following are used merely for the convenience of explanation, and are not intended to limit the present disclosure to these directions in implementing the present disclosure.

[Schematic Configuration of Imaging Apparatus]

Figure 1:
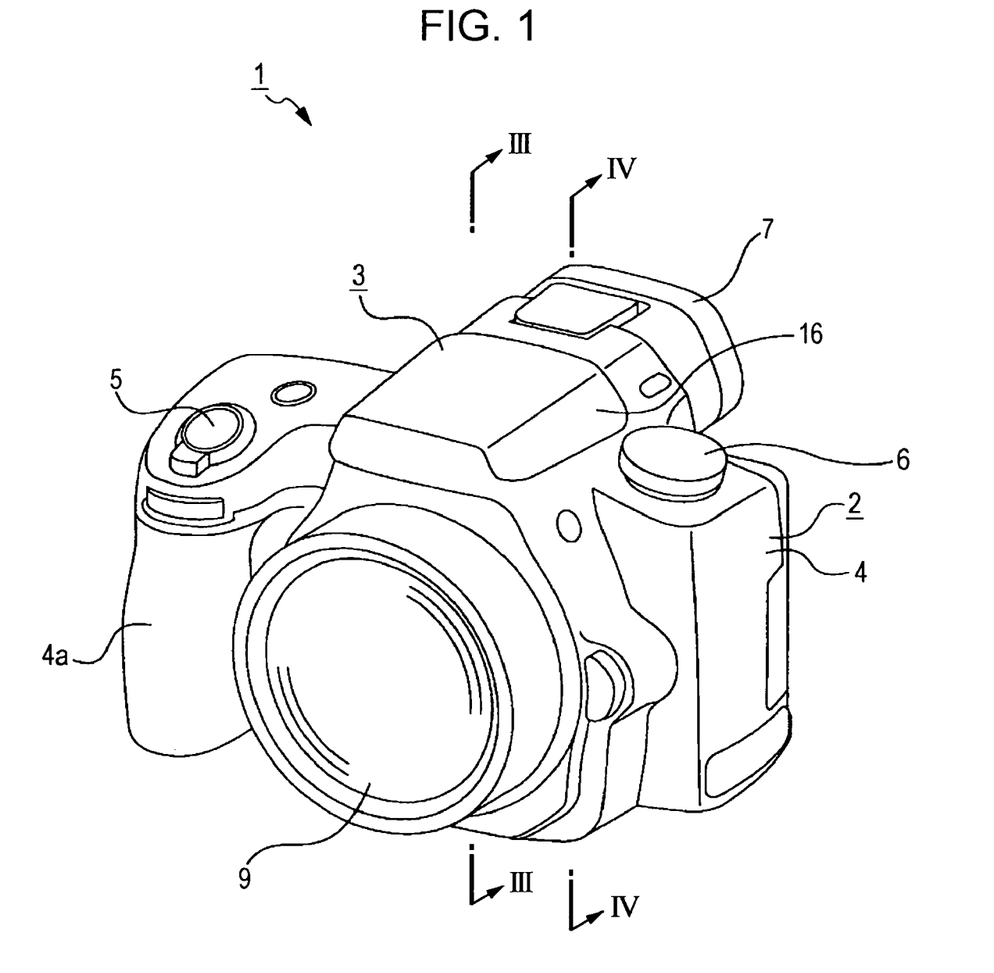
FIG. 1 is a perspective view showing, together with FIGS. 2 to 12, an imaging apparatus according to an embodiment of the present disclosure in a state when a strobe unit is in a close position.
Figure 2:
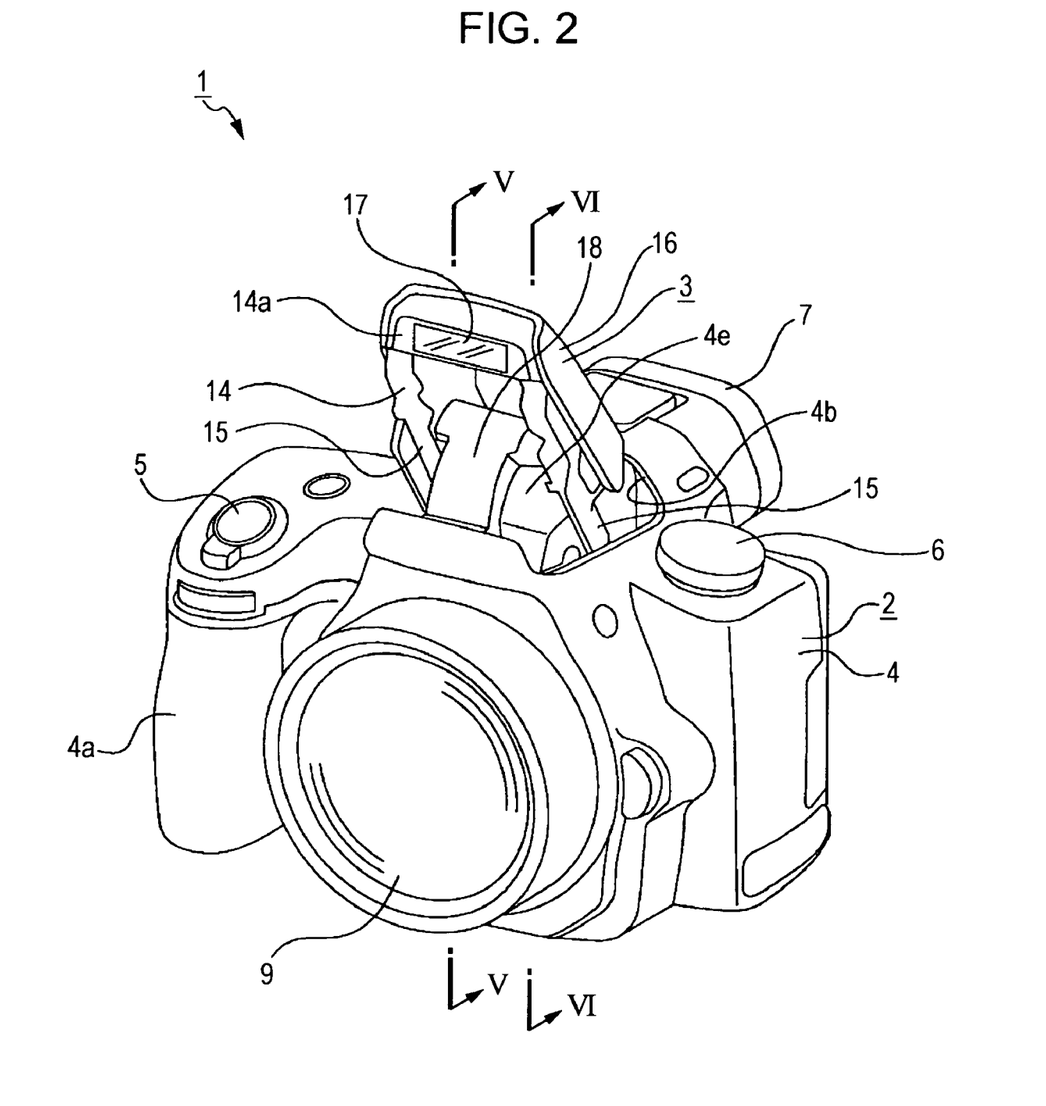
FIG. 2 is a perspective view of the imaging apparatus in a state when the strobe unit is in an open position.

An imaging apparatus (digital still camera) 1 includes an apparatus body 2, and a strobe unit 3 movably connected to the apparatus body 2 (see FIGS. 1 and 2).

The apparatus body 2 includes various necessary parts placed on the inside and outside of an outer casing 4 that is shaped like a horizontally elongated box.

The right end of the outer casing 4 is provided as a grip part 4a that is projected forward. Shooting is done while the grip part 4a is gripped by the photographer.

A shutter button 5 that is operated when shooting, and an operating dial 6 for making predetermined settings and the like are placed on the top surface of the outer casing 4. Adjustment of the shutter speed and the aperture value, setting of various shooting modes, setting of various functions for each shooting mode, and so on can be performed by operating the operating dial 6.

Examples of shooting mode include Auto shooting mode in which the shutter speed and the aperture value are set automatically, and Program Auto shooting mode in which the shutter speed and the aperture value are set automatically and other settings are made manually.

Examples of setting of various functions for each shooting mode include setting of white balance adjustment, focus mode, and so on. Setting of these functions can be made by, for example, operating the operating dial 6 while viewing the settings screen displayed on a display panel described later.

A finder part 7 for viewing a subject's image captured by an imaging device described later is provided at the rear end at the upper end of the outer casing 4.

A display panel 8 is placed below the finder part 7 on the back of the outer casing 4 (see FIG. 3). In addition to subject's images captured by the imaging device, images read from a recording medium (not shown), and the like, displays and the like that are necessary when setting various modes, for example, are outputted to and displayed on the display panel 8.

Various operating switches (not shown) are placed around the display panel 8 on the back of the outer casing 4. By operating the operating switches, for example, setting of various functions including execution of camera shake compensation, and the like can be made.

A taking lens 9 is placed on the front of the outer casing 4 (see FIGS. 1 and 2). Various lenses or lens groups (not shown) are placed along the optical axis in rear of the taking lens 9. At the front of the outer casing 4, an interchangeable lens (not shown) can be attached and detached at a position for opening and closing the taking lens 9.

An opening 4b that communicates the inside and outside of the outer casing 4 with each other is formed in the top surface of the outer casing 4 (see FIGS. 2 to 6). A storage space 4c that communicates with the opening 4b is defined at the upper end inside the outer casing 4. A placement space 4d is defined inside the outer casing 4. The placement space 4d communicates with the storage space 4c, and is positioned adjacent to the lower side of the storage space 4c.

Figure 3:
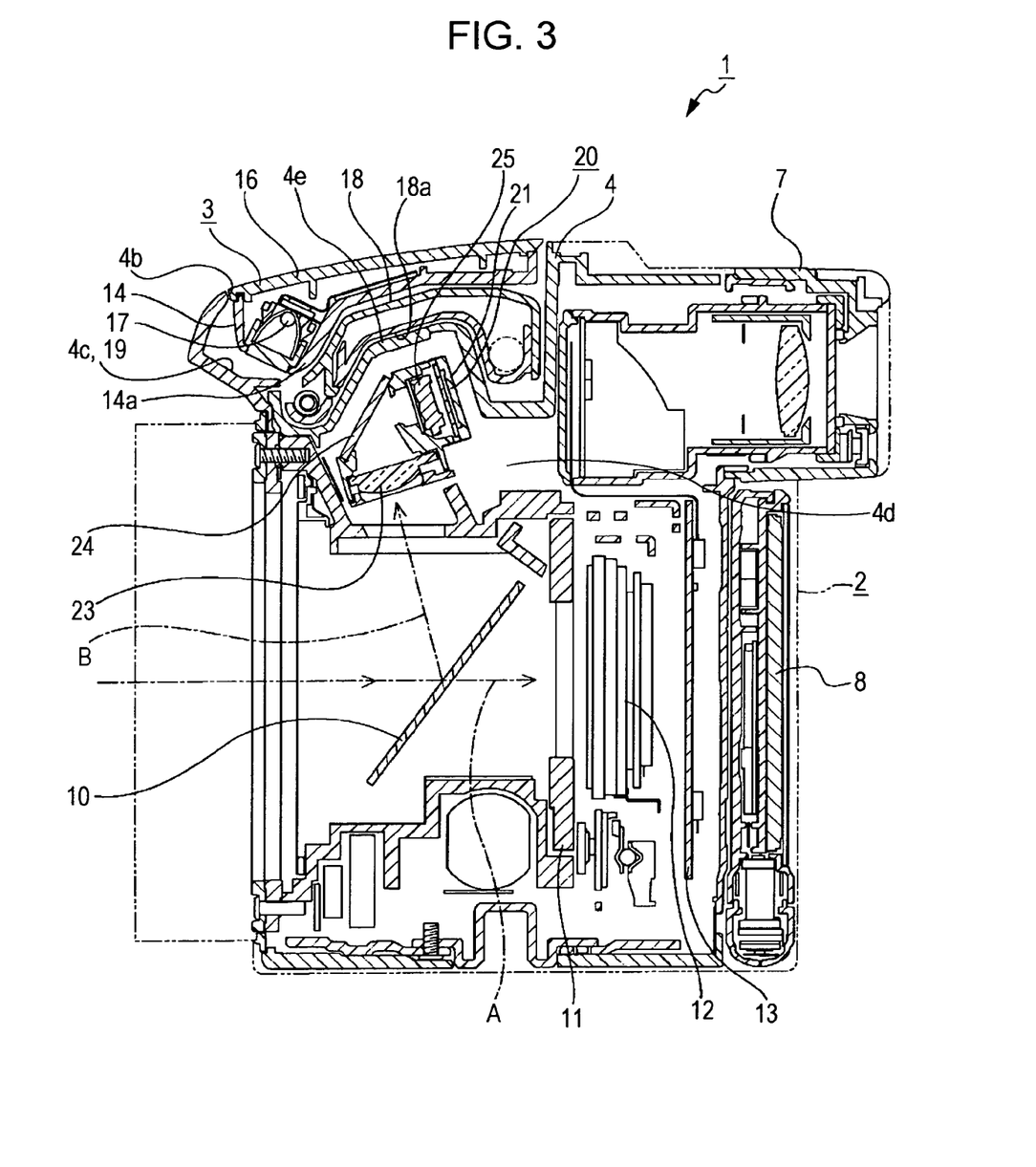
FIG. 3 is a schematic enlarged sectional view taken along the line III-III of FIG. 1.

Inside the outer casing 4, a mirror 10 is placed in rear of the taking lens 9 (see FIGS. 3 to 6). The mirror 10 is placed while being tilted by a predetermined angle with respect to the horizontal direction, that is, while being tilted by such an angle that causes incident light to be reflected by the mirror and made incident on a light-receiving lens of a sensor block described later. The mirror 10 is provided as a semi-transparent mirror that reflects and transmits incident light. Therefore, as shown in FIG. 3, all but a part of the light made incident on the mirror 10 via the taking lens 9 is transmitted through the mirror 10 to travel rearward as light A, and a part of the light is reflected by the mirror 10 to travel upward as light B.

Inside the outer casing 4, a shutter mechanism 11 and a device unit 12 are placed in rear of the mirror 10 in this order from the front side (see FIGS. 3 to 6). The device unit 12 is provided with an imaging device such as a charge coupled device (CCD) or a complementary metal oxide semiconductor (CMOS).

The light made incident from the taking lens 9 and transmitted through the mirror 10 to travel rearward is made incident on the device unit 12, and subjected to photoelectric conversion by the imaging device in the device unit 12 and captured as an image. When shooting, the shutter mechanism 11 is caused to operate in accordance with an operation on the shutter button 5, and the subject is shot.

A circuit board 13 facing toward the front and rear is placed on the rear side of the device unit 12 inside the outer casing 4. Various circuits for performing overall control of the imaging apparatus 1 are formed on the circuit board 13.

The strobe unit 3 is placed at the upper end of the outer casing 4 in such a state that can open and close the opening 4b. The strobe unit 3 is movable with respect to the apparatus body 2 between a close position that closes the opening 4b, and an open position that opens the opening 4b. The strobe unit 3 has the function of radiating auxiliary light when shooting.

The strobe unit 3 has a body part 14, leg parts 15, 15 that are projected from the body part 14 and provided on the left and right so as to be separated from each other, and a lid part 16 attached to the body part 14. The distal ends of the leg parts 15, 15 are each pivotably connected to the apparatus body 2 inside the outer casing 4. The body part 14 is provided with an attachment surface part 14a, and a light-emitting part 17 is attached to the attachment surface part 14a.

Figure 7:
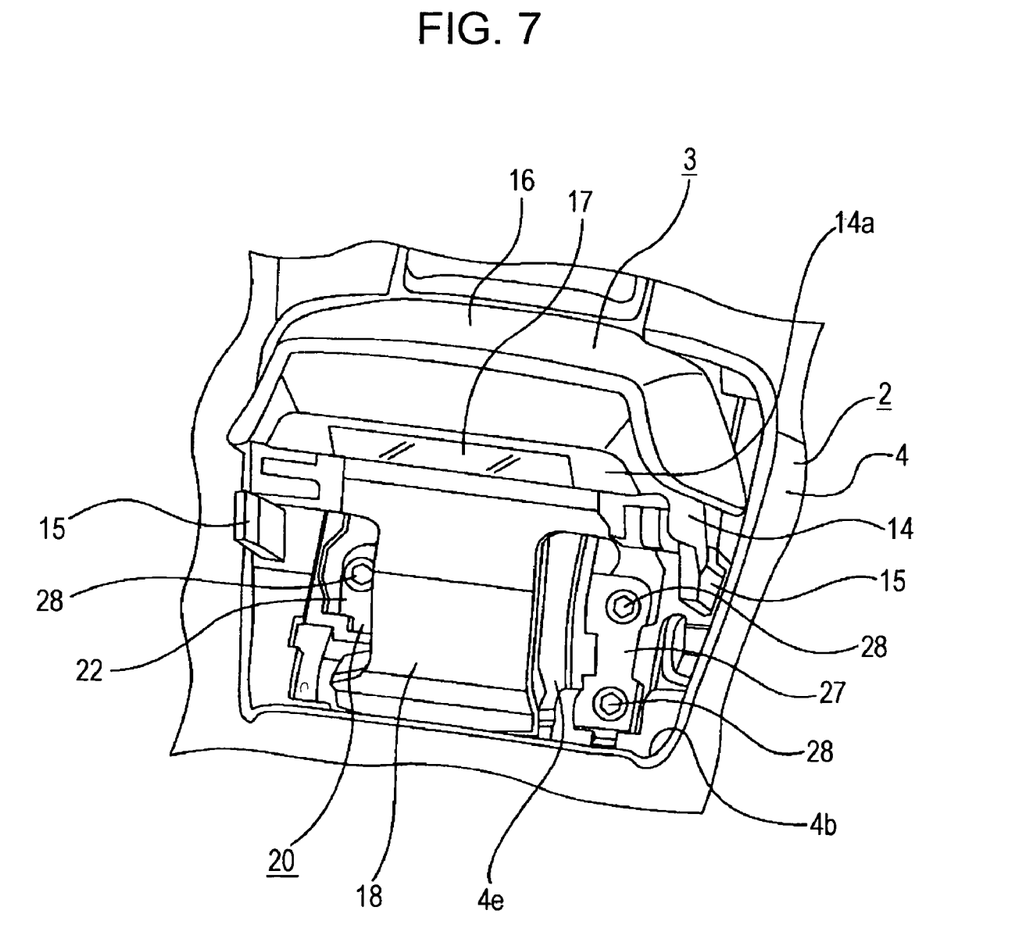
FIG. 7 is an enlarged perspective view showing a state before protective covers are attached, when the strobe unit is in the open position.

The upper end of the connecting arm 18 is pivotably connected to the body part 14. The lower end of the connecting arm 18 is pivotably connected to the apparatus body 2 inside the outer casing 4. A recess 18a that opens downward is formed in the connecting arm 18. The connecting arm 18 is formed smaller in breadth than the body part 14 of the strobe unit 3, and is placed at a position corresponding to the portion of the body part 14 excluding the left and right ends (see FIGS. 7 and 8).

Figure 4:
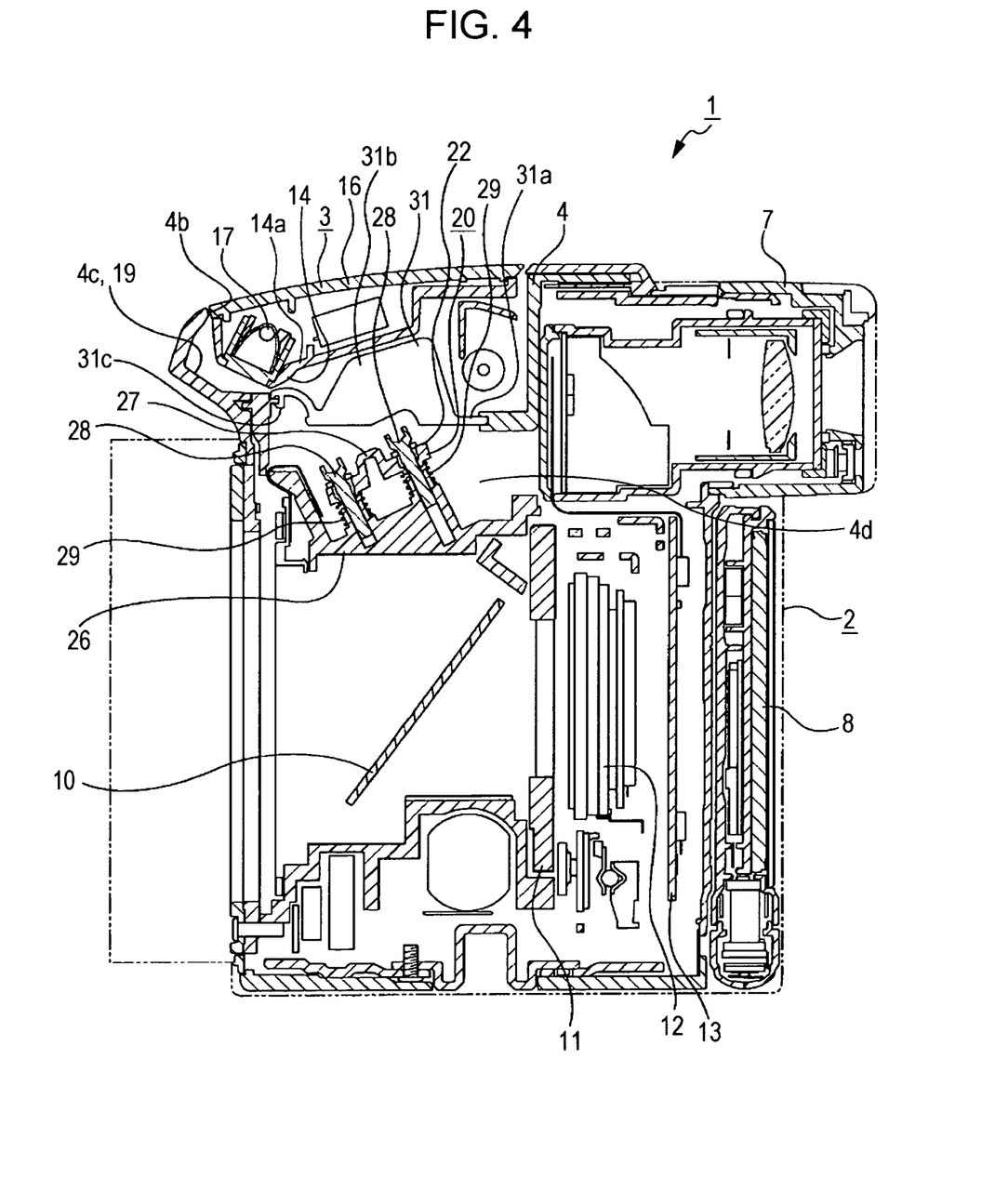
FIG. 4 is a schematic enlarged sectional view taken along the line IV-IV of FIG. 1.
Figure 5:
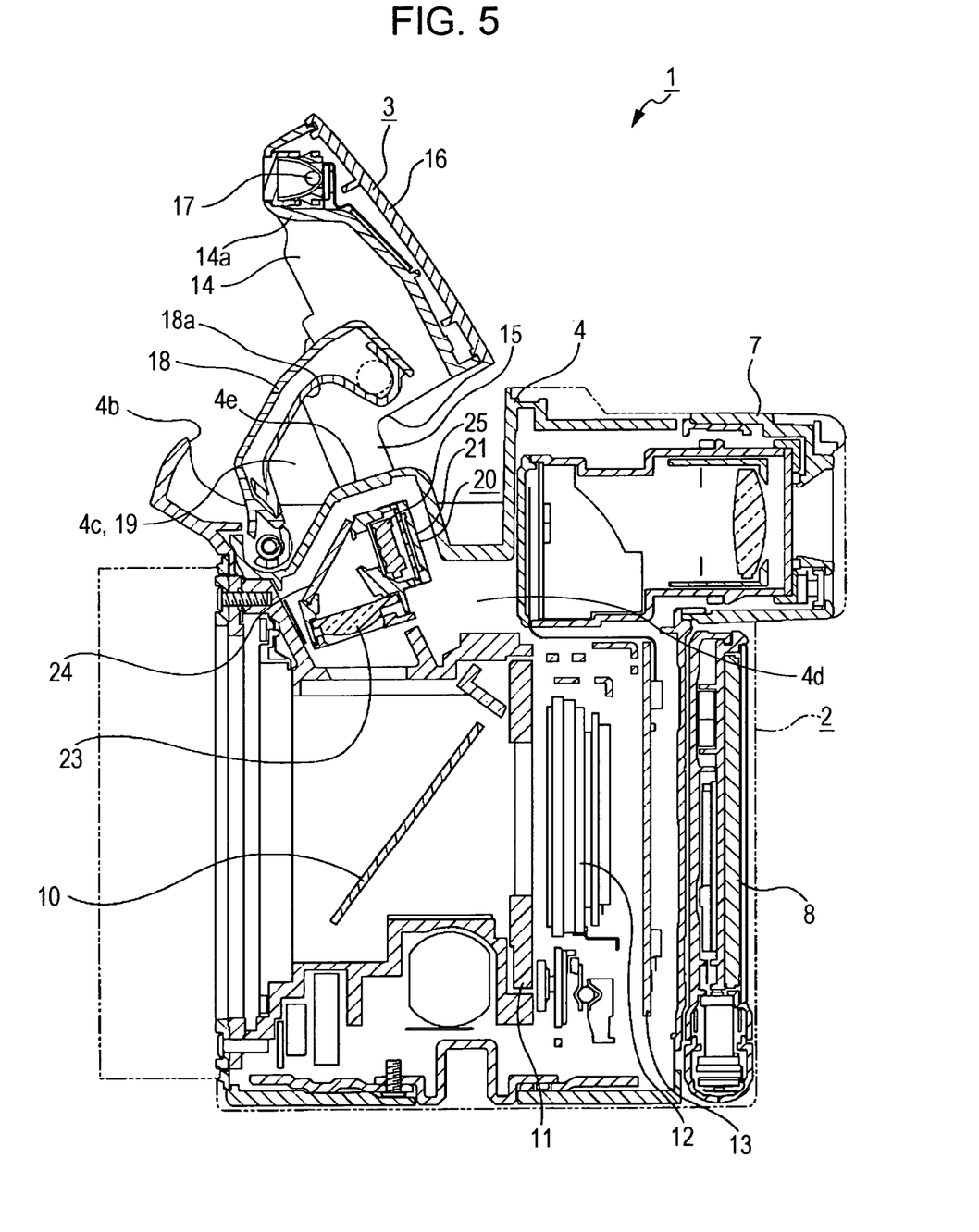
FIG. 5 is a schematic enlarged sectional view taken along the line V-V of FIG. 2.

The strobe unit 3 is locked in the close position by a lock mechanism (not shown), and the light-emitting part 17 is stored in the storage space 4c defined inside the outer casing 4 (see FIGS. 3 and 4). In the state in which the strobe unit 3 is in the close position, the opening 4b is closed by the lid part 16. When the strobe unit 3 is moved from the close position toward the open position, the distal ends of the leg parts 15 of the strobe unit 3 and the lower end of the connecting arm 18 are each pivoted with respect to the apparatus body 2, and the upper end of the connecting arm 18 is pivoted with respect to the body part 14 of the strobe unit 3. In the state in which the strobe unit 3 has been moved to the open position, the opening 4b is opened, the light-emitting part 17 is exposed to the outside from the opening 4b so as to face straight ahead, and the storage space 4c is defined as an adjustment space 19 used for rotating adjusting screws of a sensor adjusting part described later (see FIGS. 5 and 6).

A sensor unit 20 is placed in the placement space 4d defined inside the outer casing 4 (see FIGS. 3 to 6). The sensor unit 20 has a sensor block 21 and a sensor adjusting part 22.

As shown in FIG. 3, the sensor block 21 has a light-receiving lens 23, a reflector 24, and an autofocus sensor 25. The light-receiving lens 23 has the function of receiving and gathering light reflected by the mirror 10. The reflector 24 has the function of reflecting the light gathered by the light-receiving lens 23 to make the light incident on the autofocus sensor 25. When light is made incident on the autofocus sensor 25, focus state information is detected by the incident light, and the autofocus function is executed on the basis of the detected focus state information.

As shown in FIG. 4, the sensor adjusting part 22 has a support base 26, an adjusting base 27 movably supported on the support base 26, three adjusting screws 28, 28, 28 passed through the adjusting base 27 and brought into threaded engagement with the support base 26, and urging springs 29, 29, 29 for urging the adjusting base 27 with respect to the support base 26. The adjusting screws 28, 28, 28 are positioned at the left and right ends of the adjusting base 27 (see FIG. 7).

The support base 26 is fixed in place inside the outer casing 4. The adjusting base 27 is urged by the urging springs 29, 29, 29 away from the support base 26, that is, in the axial direction of the adjusting screws 28, 28, 28, and coupled to the sensor block 21.

Therefore, by rotating the adjusting screws 28, 28, 28 with an adjustment jig 50 such as a screwdriver, the adjusting base 27 is displaced (moved) with respect to the support base 26, and the tilt of the sensor block 21 (autofocus sensor 25) coupled to the adjusting base 27 is adjusted.

A cover part 4e formed integrally with the outer casing 4 is positioned above the sensor unit 20 (see FIGS. 3 to 6). The cover part 4e is formed in the shape of a cup that opens downward as seen in longitudinal section, and is positioned above the portion of the sensor unit 20 excluding the left and right ends (see FIGS. 7 and 8).

In the state in which the strobe unit 3 has been moved to the open position, as mentioned above, the storage space 4c defined inside the outer casing 4 is defined as the adjustment space 19, and the adjustment space 19 is made to communicate with the placement space 4d in which the sensor unit 20 is placed, and the opening 4b formed in the outer casing 4. At this time, the cover part 4e is visible at the central part in the left-right direction through the opening 4b in the outer casing 4, and the adjusting screws 28, 28, 28 are visible on the left and right of the cover part 4e.

In the state in which the strobe unit 3 has been moved to the close position, as shown in FIG. 3, the cover part 4e of the outer casing 4 is inserted in the recess 18a of the connecting arm 18 from below, and the connecting arm 18 is positioned so as to overlap the cover part 4e.

[Adjustment of Autofocus Sensor]

Figure 9:
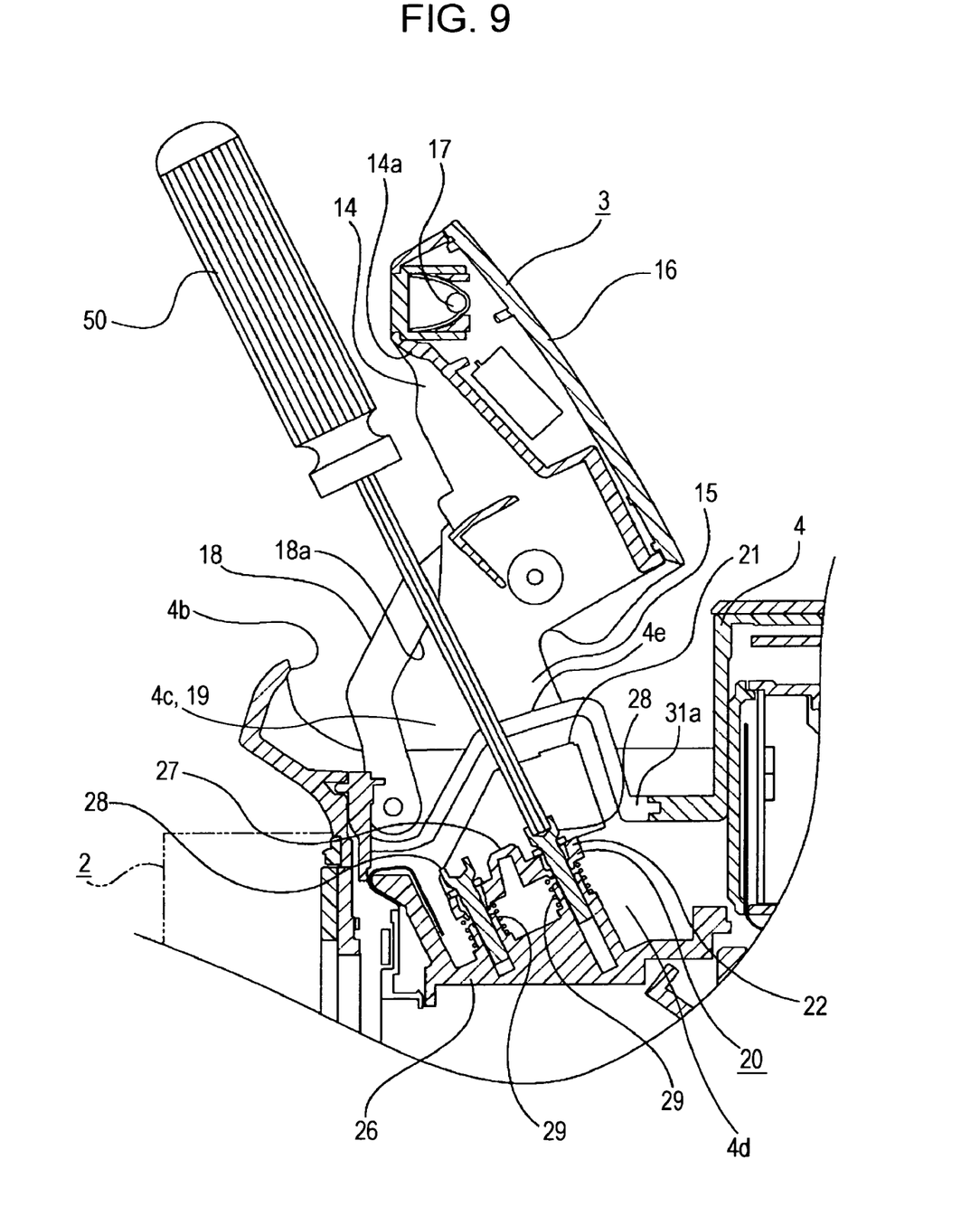
FIG. 9 is a schematic enlarged sectional view showing a state in which an autofocus sensor is being adjusted.

In the imaging apparatus 1, in the state in which the strobe unit 3 has been moved to the open position, as shown in FIG. 9, the tilt of the sensor block 21 (autofocus sensor 25) can be adjusted by inserting the adjustment jig 50 such as a screwdriver into the adjustment space 19, and rotating the adjusting screws 28, 28, 28.

At this time, the attachment surface part 14a and the lid part 16 of the strobe unit 3 are facing substantially forward and diagonally downward, thus allowing the adjustment jig 50 to be inserted into the adjustment space 19 along the inner surface of the lid part 16.

Figure 6:
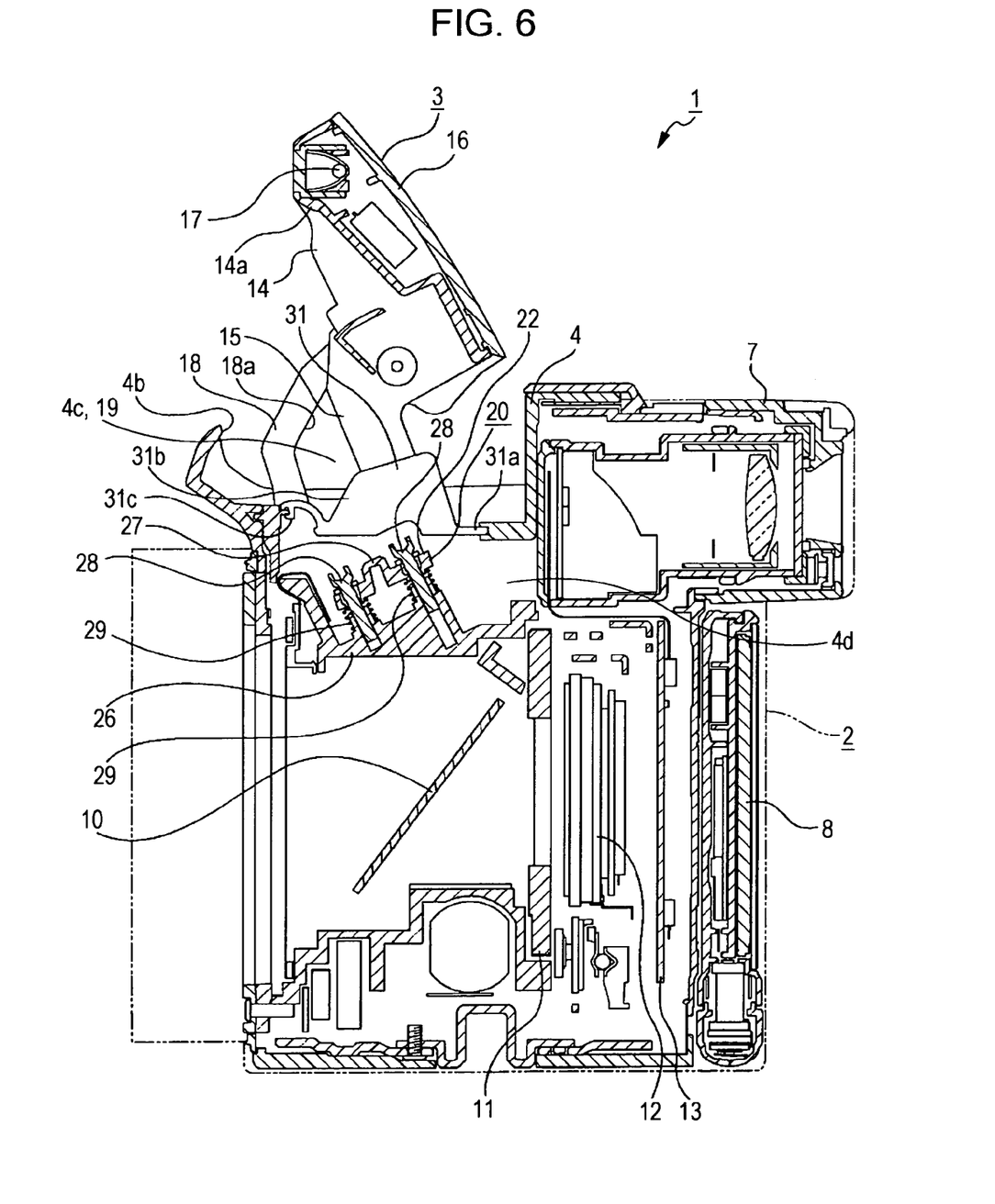
FIG. 6 is a schematic enlarged sectional view taken along the line VI-VI of FIG. 2.
Figure 8:
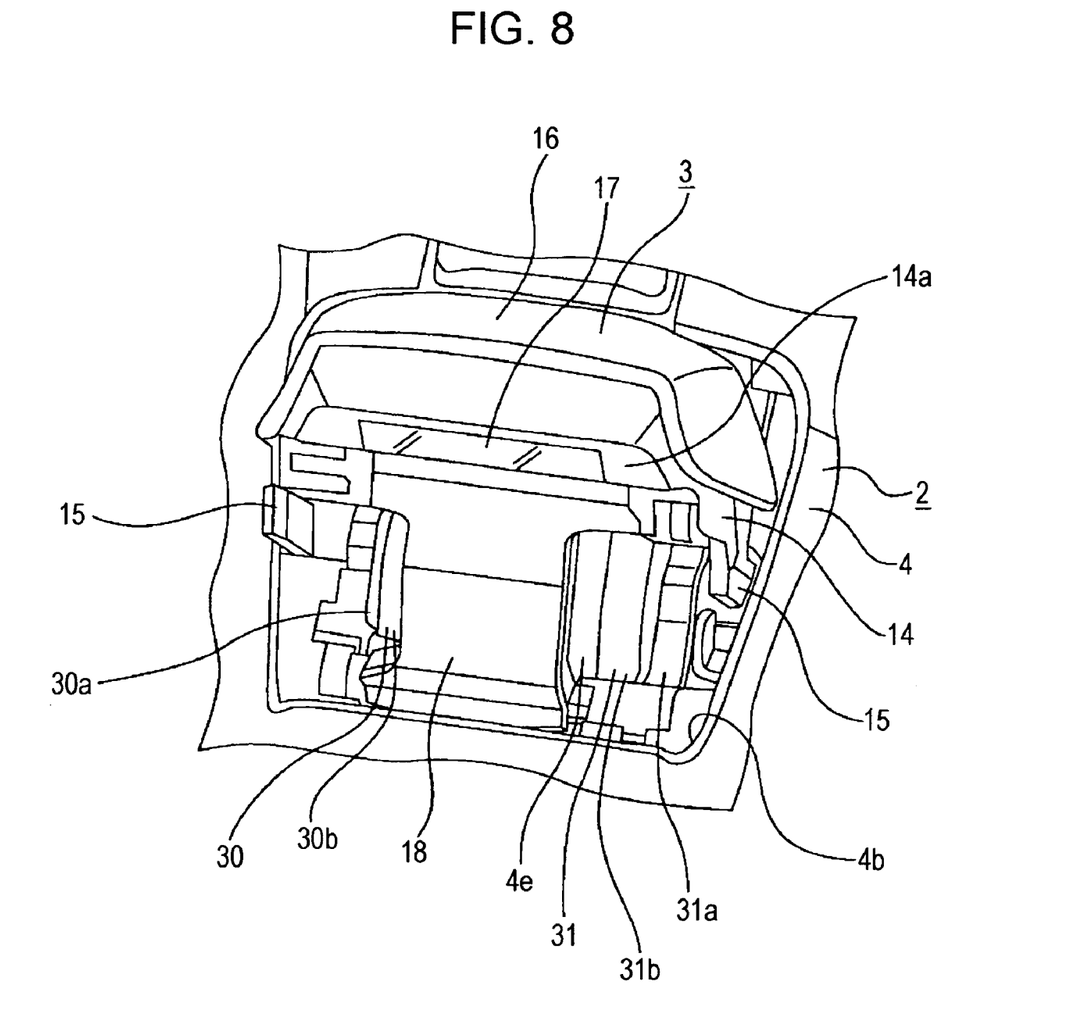
FIG. 8 is an enlarged perspective view showing a state in which the protective covers are attached, when the strobe unit is in the close position.
Figure 10:
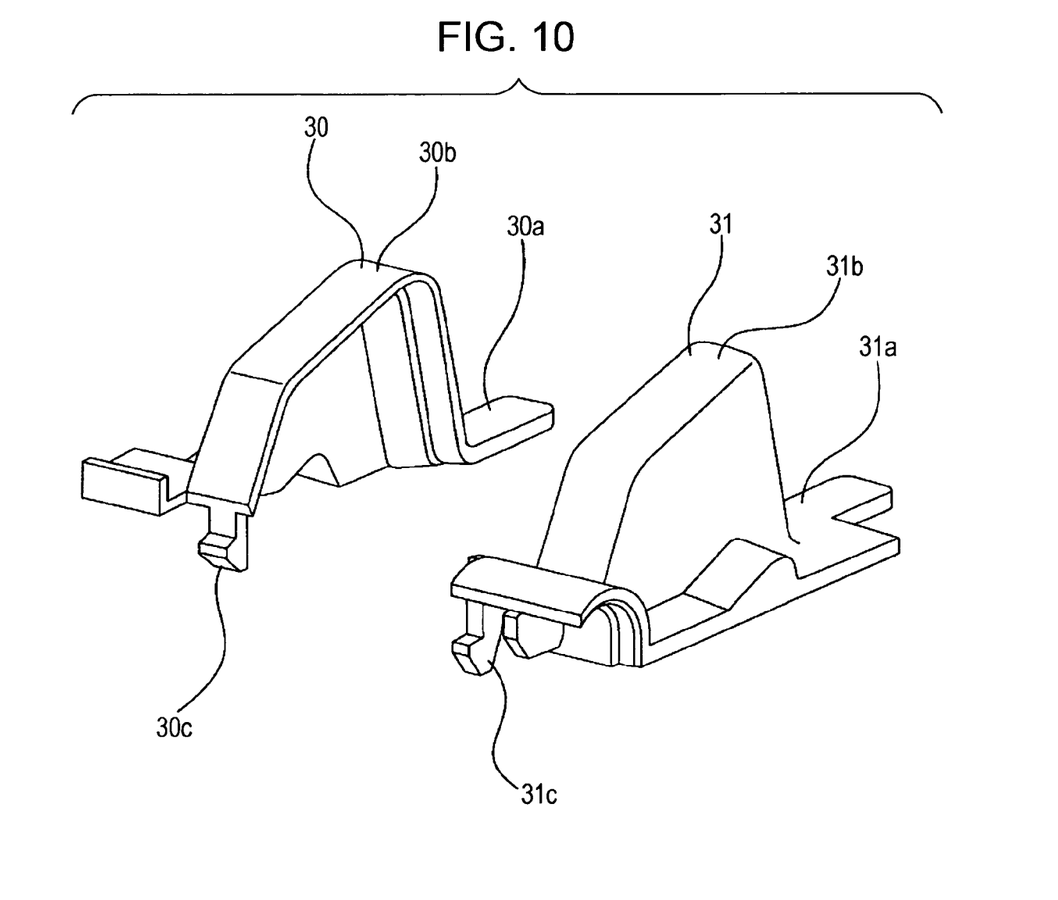
FIG. 10 is an enlarged perspective view of the protective covers.

When the tilt adjustment of the sensor block 21 is finished as mentioned above, protective covers 30 and 31 are attached to the left and right ends of the cover part 4e (see FIGS. 6 and 8). As shown in FIG. 10, the protective covers 30 and 31 have attaching bases 30a and 31a, covering parts 30b and 31b projected upward from the attaching bases 30a and 31a, and engaging members 30c and 31c projected downward from the front ends of the attaching bases 30a and 31a, respectively.

As shown in FIG. 6, the protective covers 30 and 31 are attached to the left and right of the cover part 4e by engaging the engaging members 30c and 31c and the rear ends of the attaching bases 30a and 31a with a part of the outer casing 4, in a state in which the covering parts 30b and 31b cover the adjusting screws 28, 28, 28, respectively (see FIG. 8).

It should be noted that the attaching method of the protective covers 30 and 31 to the cover part 4e is not limited to the engagement mentioned above. For example, it is also possible to employ an attaching method using bonding, screwing, or the like.

[Configuration of Imaging Apparatus]

Figure 11:
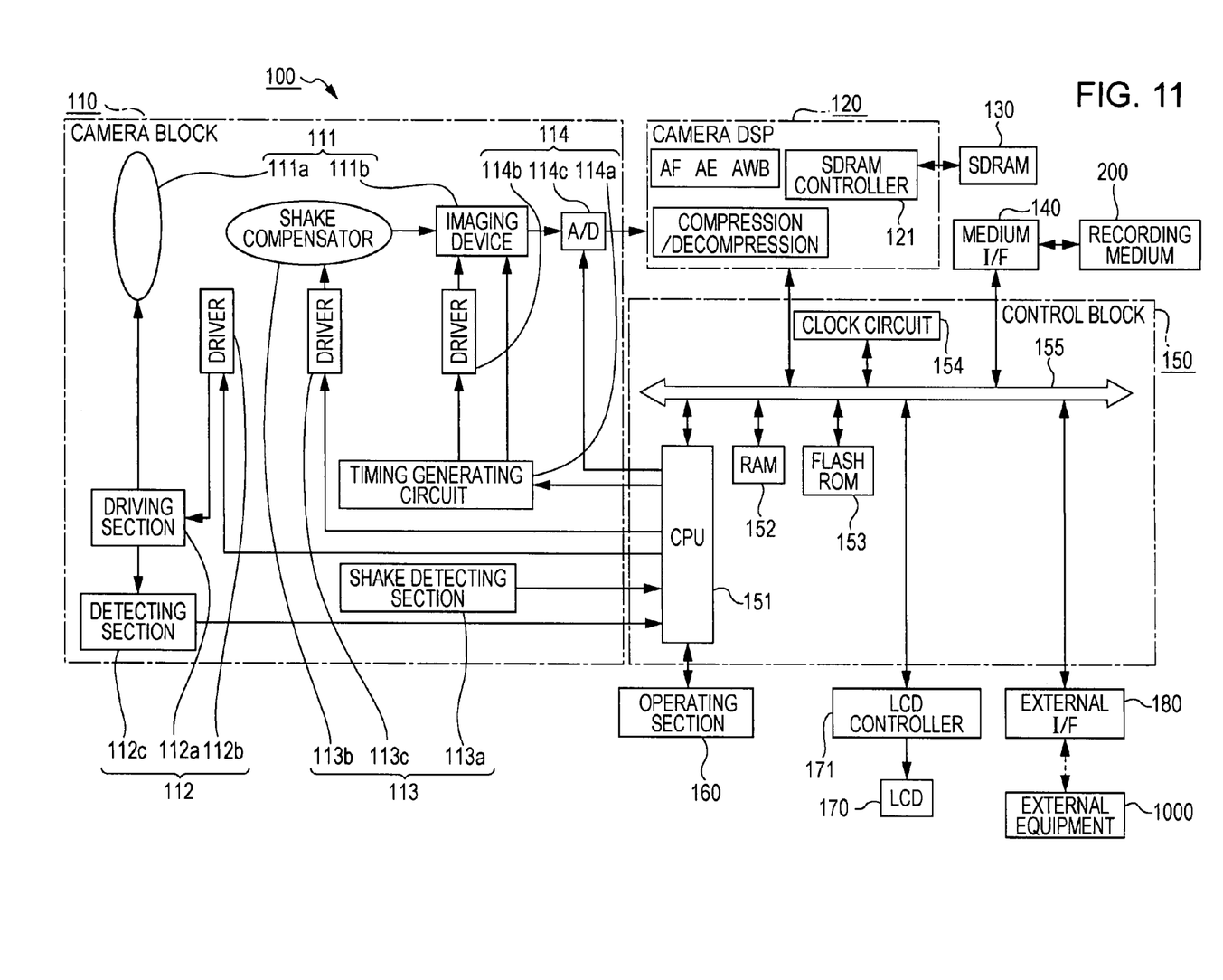
FIG. 11 is a block diagram of the imaging apparatus.

Next, an example of the circuit configuration of an imaging apparatus will be described (see FIG. 11).

An imaging apparatus 100 (corresponding to the imaging apparatus 1) includes a camera block 110, a camera digital signal processor (DSP) 120, a synchronous dynamic random access memory (SDRAM) 130, a medium interface 140, a control block 150, an operating part 160, a liquid crystal display (LCD) 170, and an external interface 180. A recording medium 200 can be attached to and removed from the imaging apparatus 100.

As the recording medium 200, various kinds of recording media can be used, including a so-called memory card using a semiconductor memory, and a disc-like recording medium such as a recordable digital versatile disc (DVD) or a recordable compact disc (CD).

The camera block 110 includes an imaging part 111, a lens driving system 112, a camera shake compensation system 113, and an image extraction system 114.

The imaging part 111 has an imaging lens 111a for obtaining an optical image, and an imaging device 111b (corresponding to the imaging device in the device unit 12) which converts the obtained optical image into an electrical signal.

The lens driving system 112 has the function of driving a movable lens within the imaging lens 111a to perform zooming and focusing. The lens driving system 112 has a driving section 112a such as a stepping motor for driving the movable lens, a driver 112b that transmits a driving signal to the driving section 112a, and a detecting section 112c that feeds back operation of the driving section 112a.

The camera shake compensation system 113 has a shake detecting section 113a such as a detecting element that detects shake of the imaging apparatus 100, and a driver 113c that causes a shake compensator 113b to operate on the basis of the result of detection by the shake detecting section 113a.

The image extraction system 114 has a timing generating circuit 114a that generates the timing for driving the imaging device 111b in accordance with control by the control block 150, a driver 114b that drives the imaging device 111b on the basis of the timing generated by the timing generating circuit 114a, and an A/D conversion circuit 114c that converts an analog signal extracted from the imaging device 111b into a digital signal.

The A/D conversion circuit 114c performs a correlated double sampling (CDS) process on image information that is an inputted electrical signal to ensure a good S/N ratio, performs an automatic gain control (AGC) process to control gain, and performs analog/digital (A/D) conversion to generate image data as a digital signal, for example.

The camera DSP 120 performs signal processing such as auto focus (AF), auto exposure (AE), and auto white balance (AWB) on the image data inputted from the A/D conversion circuit 114c. The image data that has undergone signal processing such as AF, AE, and AWB is compressed in a predetermined format, and outputted and recorded to the recording medium 200 via the control block 150.

The camera DSP 120 is provided with an SDRAM controller 121. Data is read from and written to the SDRAM 130 at high speed by a command from the SDRAM controller 121.

The control block 150 is a microcomputer configured in such a way that parts such as a central processing unit (CPU) 151, a random access memory (RAM) 152, a flash read only memory (ROM) 153, and a clock circuit 154 are connected via a system bus 155. The control block 150 has the function of controlling various parts of the imaging apparatus 100.

The CPU 151 transmits command signals to the driver 114b and so on via the drivers 112b and 113c and the timing generating circuit 114a, thereby causing these parts to operate.

The RAM 152 is mainly used as a work area for temporarily storing intermediate processing results.

Various programs executed by the CPU 151, data necessary for each processing, and so on are stored in the flash ROM 153.

The clock circuit 154 is a circuit that outputs the current year, month, and day, the current day of the week, the current time, the date and time of shooting, and so on.

When an operation is made on the operating part 160 (corresponding to the shutter button 5, the operating dial 6, and the like), a signal corresponding to the operation is inputted to the CPU 151, and command signals are transmitted from the CPU 151 to various parts on the basis of the inputted signal.

The LCD 170 (corresponding to the display panel 8) is controlled by an LCD controller 171 connected to the system bus 155. On the LCD 170, various kinds of information such as image data based on a driving signal from the LCD controller 171 are displayed.

The external interface 180 is connected to the system bus 155. The external interface 180 is a connecting part that connects external equipment 1000 such as a personal computer to the imaging apparatus 100. When the external equipment 1000 is connected to the imaging apparatus 100 via the external interface 180, for example, it is possible to receive image data from the external equipment 1000 and record the image data to the recording medium 200, or output image data recorded on the recoding medium 200 to the external equipment 1000. It should be noted that the recording medium 200 is connected to the control block 150 via the medium interface 140 connected to the system bus 155.

By connecting the external equipment 1000 such as a communication module to the imaging apparatus 100 via the external interface 180, for example, it is possible to connect to a network such as the Internet to acquire various image data or other information, and record the acquired data or the like to the recording medium 200, or transmit data recorded on the recording medium 200 to the communicating party via a network.

It should be noted that the external interface 180 can be provided as a wired interface such as an Institute of Electrical and Electronics Engineers (IEEE) 1394 or a universal serial bus (USB), or can be provided as a wireless interface using light or radio waves.

Image data recorded on the recording medium 200 is read on the basis of an operation signal corresponding to an operation on the operating part 160 made by the user, and transmitted to the camera DSP 120 via the medium interface 140.

For compressed image data read and inputted from the recording medium 200, the camera DSP 120 performs a decompression process (expansion process) of the compressed data, and transmits the decompressed image data to the LCD controller 171 via the system bus 155. The LCD controller 171 transmits an image signal based on the inputted image data to the LCD 170, and an image based on the image signal is displayed on the LCD 170.

[Overview]

As described above, in the imaging apparatus 1, the sensor unit 20 is placed in the placement space 4d defined in the upper side inside the outer casing 4, and light reflected by the mirror 10 is made incident on the autofocus sensor 25.

Therefore, it is unnecessary to provide a sub-mirror for further reflecting light transmitted through the mirror to make the light incident on the autofocus sensor 25. Thus, it is unnecessary to provide a space for placing the sub-mirror inside the outer casing 4, thereby enabling corresponding miniaturization. Also, since no sub-mirror is necessary, the number of components can be reduced.

Further, since it is unnecessary to adjust the tilt of the sub-mirror, the assembly steps for the imaging apparatus 1 can be reduced to achieve shorter assembly time.

Furthermore, the storage space 4c, in which the light-emitting part 17 of the strobe unit 3 is stored, is defined as the adjustment space 19. Thus, it is unnecessary to define a dedicated space for inserting the adjustment jig 50 inside the outer casing 4, thereby enabling corresponding miniaturization. In addition, tilt adjustment of the autofocus sensor 25 can be performed by moving the strobe unit 3 to the open position and inserting the adjustment jig 50 from the adjustment space 19. Thus, tilt adjustment of the autofocus sensor 25 can be easily performed.

When the strobe unit 3 is moved to the open position, the adjustment jig 50 for rotating the adjusting screws 28, 28, 28 can be inserted into the adjustment space 19 in the direction along the inner surface of the lid part 16 and the inner surface of the attachment surface part 14a of the body part 14.

Therefore, when inserting the adjustment jig 50 into the adjustment space 19, the lid part 16 and the attachment surface part 14a of the body part 14 do not easily come into contact with the adjustment jig 50, and also the adjustment jig 50 is smoothly inserted into the adjustment space 19. Thus, adjustment of the autofocus sensor 25 can be performed easily and quickly. Also, when inserting the adjustment jig 50 into the adjustment space 19, the lid part 16 and the body part 14 each serve as a guide part for the adjustment jig 50. Thus, adjustment of the autofocus sensor 25 can be performed easily and reliably.

Further, in the imaging apparatus 1, the cover part 4e that covers at least a part of the sensor unit 20 from the opening 4b side is formed integrally with the outer casing 4. Thus, the sensor unit 20 can be protected by a simple structure without causing an increase in manufacturing cost.

Furthermore, the protective covers 30 and 31 are provided, which are attached to the cover part 4e after adjustment of the autofocus sensor 25 to close the sensor unit 20 from the opening 4b side. This prevents a finger or the like from accidentally contacting the sensor unit 20 after the adjustment is done, thereby preventing damage to or breakage of the sensor unit 20.

In addition, the adjusting screws 28, 28, 28 of the sensor adjusting part 22 are positioned on the left and right of the connecting arm 18. This prevents damage by the adjustment jig 50 to the portion of the sensor adjusting part 22 where the adjusting screws 28, 28, 28 are not positioned when the adjustment jig 50 is inserted into the adjustment space 19.

Also, in the state in which the strobe unit 3 has been moved to the close position, the connecting arm 18 is positioned so as to overlap the cover part 4e. Thus, the connecting arm 18 is received by the cover part 4e, thereby preventing deformation or breakage that occurs when an external force is exerted on the connecting arm 18. Also, since the connecting arm 18 is made to overlap the cover part 4e when in the close position, the space inside the outer casing 4 can be made that much smaller, thereby achieving miniaturization of the imaging apparatus 1.

The present disclosure contains subject matter related to that disclosed in Japanese Priority Patent Application JP 2010-186572 filed in the Japan Patent Office on Aug. 23, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
an apparatus body having an outer casing, at least a shutter mechanism and an imaging device that are placed inside the outer casing, an opening formed in the outer casing, a storage space communicating with the opening, and a placement space communicating with the storage space, the storage space and the placement space being defined inside the outer casing;
a strobe unit having a lid part and a light-emitting part, the strobe unit being connected to the apparatus body so as to be movable between a close position in which the opening is closed by the lid part and the light-emitting part is stored in the storage space, and an open position in which the opening is opened and the light-emitting part is exposed to an outside of the apparatus body from the opening;
a sensor unit placed in the placement space, the sensor unit having an autofocus sensor and a sensor adjusting part provided with a plurality of adjusting screws that are rotatable for adjusting a tilt of the autofocus sensor; and
a mirror that is placed inside the outer casing and reflects a part of incident light toward the autofocus sensor,
wherein when the strobe unit is moved to the open position, the storage space is defined as an adjustment space into which an adjustment jig for rotating the adjusting screws can be inserted.

2. The imaging apparatus according to claim 1, wherein the adjustment jig can be inserted into the adjustment space in a direction along an inner surface of the lid part.

3. The imaging apparatus according to claim 1, further comprising a cover part that covers at least a part of the sensor unit from the opening side, the cover part being formed integrally with the outer casing.

4. The imaging apparatus according to claim 3, further comprising a protective cover that is attached to the cover part after adjustment of the autofocus sensor to close the sensor unit from the opening side.

5. The imaging apparatus according to claim 1, further comprising a connecting arm that connects the strobe unit to the apparatus body,
wherein the adjusting screws of the sensor adjusting part are each positioned on an opposite side across the connecting arm.

6. The imaging apparatus according to claim 1, further comprising:
a cover part that covers at least a part of the sensor unit from the opening side, the cover part being formed integrally with the outer casing; and
a connecting arm that connects the strobe unit to the apparatus body,
wherein the connecting arm overlaps the cover part when the strobe unit is moved to the close position.

* * * * *